US010087783B2

(12) United States Patent
Sahl et al.

(10) Patent No.: US 10,087,783 B2
(45) Date of Patent: Oct. 2, 2018

(54) COLOR VARYING RANDOM EVENT-DETERMINING GAMING OBJECTS

(71) Applicants: Daniel L. Sahl, Las Vegas, NV (US); Russel Brooke Dunn, Henderson, NV (US); Mark L. Yoseloff, Henderson, NV (US); Mark A. Litman, Edina, MN (US)

(72) Inventors: Daniel L. Sahl, Las Vegas, NV (US); Russel Brooke Dunn, Henderson, NV (US); Mark L. Yoseloff, Henderson, NV (US); Mark A. Litman, Edina, MN (US)

( * ) Notice: Subject to any disclaimer, the term of this patent is extended or adjusted under 35 U.S.C. 154(b) by 0 days.

(21) Appl. No.: 15/662,579

(22) Filed: Jul. 28, 2017

(65) Prior Publication Data

US 2018/0010485 A1    Jan. 11, 2018

Related U.S. Application Data

(63) Continuation of application No. 14/938,077, filed on Nov. 11, 2015, now Pat. No. 9,720,649.

(60) Provisional application No. 62/077,952, filed on Nov. 11, 2014.

(51) Int. Cl.
*A63F 5/00* (2006.01)
*F01D 25/24* (2006.01)
*F02C 7/25* (2006.01)

(52) U.S. Cl.
CPC ............... *F01D 25/24* (2013.01); *F02C 7/25* (2013.01); *Y02T 50/672* (2013.01)

(58) Field of Classification Search
None
See application file for complete search history.

(56) References Cited

U.S. PATENT DOCUMENTS

| | | | | |
|---|---|---|---|---|
| 4,848,768 A | * | 7/1989 | Barlow | A63F 3/00006 273/141 A |
| 2005/0026673 A1 | * | 2/2005 | Paulsen | G07F 17/3267 463/16 |
| 2006/0119036 A1 | * | 6/2006 | Scozio | A63F 5/04 273/142 R |
| 2007/0087808 A1 | * | 4/2007 | Luciano, Jr. | G07F 17/3202 463/16 |
| 2011/0065490 A1 | * | 3/2011 | Lutnick | G07F 17/32 463/16 |
| 2012/0115563 A1 | * | 5/2012 | Kido | G07F 17/3211 463/17 |

* cited by examiner

*Primary Examiner* — Jason Yen
(74) *Attorney, Agent, or Firm* — Mark A. Litman & Assoc. P.A.

(57) ABSTRACT

A game object is used as a moving object to provide a random outcome event by movement and final stoppage in an outcome indicating position or mode. Examples are die, dice, balls, roulette balls, roulette wheels and pointers on candy wheel. The object has: A) a game object body; B) the game object body containing an accelerometer microchip or a receiver in communication with a transmitter, power source and light-emitting elements within the game object body, light from the light-emitting body being visible outside the game object body; and C) the microchip closing an electronic circuit for a period of time less than 5 minutes after the game body is moved.

21 Claims, 5 Drawing Sheets

FIGURE 1 - (PRIOR ART)
Roulette table layout
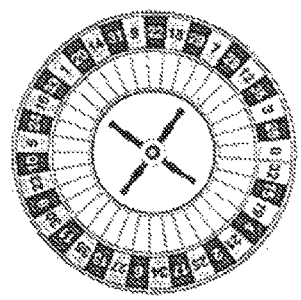
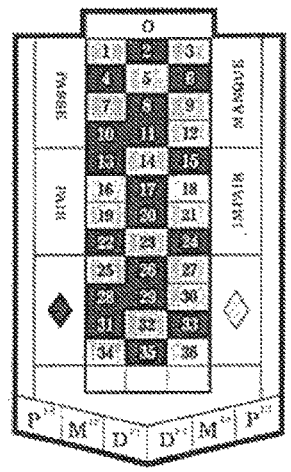
American style layout, French single zero wheel

COLOR VARYING RANDOM EVENT-DETERMINING GAMING OBJECTS

RELATED APPLICATION DATA

This application claims priority under 35 U.S.C. 120 as a Continuation of U.S. patent application Ser. No. 14/938,077, filed 1 Nov. 2015, titled "COLOR VARYING RANDOM EVENT-DETERMINING GAMING OBJECTS", which in turn claims priority from U.S. Provisional Patent Application Ser. No. 62/077,952, filed 11 Nov. 2014, titled "COLOR VARYING RANDOM EVENT-DETERMINING GAMING OBJECTS."

BACKGROUND OF THE INVENTION

1. Field of the Invention

The present invention relates to the field of games and gaming in which a gaming object determines a random event outcome at the end of random motion of the gaming object. The gaming object may, for example, be a roulette ball, roulette wheel or die. The invention further relates to gaming objects having variable visual properties.

2. Background of the Art

There are numerous games (without wagering) and gaming technology (with wagers) that use physical objects that assist in the provision of random event outcomes that are used to assist in game play or gaming outcomes. Among the games in which physical gaming objects such as dice, balls, wheels with pointers and the like are Craps, Yahtzee, roulette, Monopoly® game, Parcheesi, Bar dice, Pachinko, and the like.

There have been limited advances in some of these games over the years, In gaming environments, the most significant advances in dice and roulette games have been the conversion of the games to electronic formats, converting wagering to an electronic format automation of play, and adding bonus wagers (such as streak (wagers to the underlying game.

Examples of electronic wagering systems at gaming tables (e.g., roulette and dice games) include at least U.S. Pat. Nos. 6,659,866; 6,733,388; and 8,474,820; and Published U.S. Patent Application Documents Nos. 20130184044; 20040116177; and 20110065513.

Other technologies used to try and vary wagering systems, including roulette and dice games include U.S. Pat. No. 5,634,639 (Tokito) which discloses a ball game apparatus that has a plurality of balls, a spiral rail for automatically delivering the balls, a field portion on which the balls delivered by the spiral rail can roll with a given degree of freedom, winning pocket portions and invalid pockets formed over the field portion for receiving a plurality of the balls in each of them, a CCD camera for counting the number of balls received in the winning pocket portions and a calculator for calculating a score from the number of balls counted by the CCD camera.

U.S. Pat. No. 6,120,023 (Lai) describes a random access game toy, which includes a rod member, which has a plurality of longitudinal grooves and longitudinal number bars alternatively arranged around the periphery of a top end thereof, transparent container covered on the top end of the rod member, and a set of first color balls of a first color and at least one second color ball of a second color received in the transparent container, wherein the color balls fall to the longitudinal grooves to indicate a respective number at the number bars when the rod member is held in vertical, and are received in the transparent container outside the rod member when the rod member is turned upside down.

Published U.S. Patent Application Document No. 20060217169 (Manber) provides a means for randomizing and controlling objects in a zero gravity environment. The invention also replicates and enhances traditional casino gaming experiences in zero gravity, microgravity, low gravity and variable gravity environments. This includes adapted seating for players and staff, enabling wagering, and ensuring security and integrity of the games. Both traditional casino games, such as craps, roulette and blackjack, and new games of chance are provided and modified so as to take advantage of unique properties of zero, low or variable gravity environments. Games may be either attended or unattended, and wagering may be either on-site or off-site via remote communications. Virtual games may also be played in simulated zero gravity, low gravity and variable gravity. One method of uses eight colored balls, perhaps white, or of different weight and eight differently colored balls, perhaps black and white are set into play. At the end of play eight balls are randomly selected. In another game, sixteen balls are put into play, eight of one color and eight of another. At the end of play, the balls are randomly arranged in a four by four grid. Guest are able to place a variety of bets, including but not limited to: (a) the entire pattern, (b) any one column or row, (c) the pattern of the center four balls, and (d) whether there is more of a certain number of one color balls in the top two rows then the bottom two.

Roulette players have a variety of betting options. Placing inside bets is either selecting the exact number of the pocket the ball will land in, or a small range of pockets based on their proximity on the layout. Players wishing to bet on the 'outside' will select bets on larger positional groupings of pockets, the pocket color, or whether the winning number is odd or even. The payout odds for each type of bet are based on its probability.

The roulette table usually imposes minimum and maximum bets, and these rules usually apply separately for all of a player's inside and outside bets for each spin. For inside bets at roulette tables, some casinos may use separate roulette table chips of various colors to distinguish players at the table. Players can continue to place bets as the ball spins around the wheel until the dealer announces no more bets or rien ne va plus.

When a winning number and color is determined by the roulette wheel, the dealer will place a marker, also known as a dolly, on that winning number on the roulette table layout. When the dolly is on the table, no players may place bets, collect bets, or remove any bets from the table. The dealer will then sweep away all other losing bets either by hand or rake, and determine all of the payouts to the remaining inside and outside winning bets. When the dealer is finished making payouts, the marker is removed from the board where players collect their winnings and make new bets. The winning chips remain on the board.

California Roulette

In 2004, California legalized a form of roulette known as California Roulette. By law, the game must use cards and not slots on the roulette wheel to pick the winning number. There are at least two variations. In some casinos, the dealer spins a wheel containing 38 cards from 1 to 36, plus 0 and 00, and after betting is closed, stops the wheel; a pointer identifies the winning card, which the dealer removes and shows to the players. In the Cache Creek casino in northern California, a wheel resembling a traditional roulette wheel is used, but it has only alternating red and black slots with no numbers. As the ball is spinning, the dealer takes cards from a shoe and places two of them face down on the table in red and black rectangles. When the ball lands in a red or black slot, the card in the corresponding rectangle is turned over to reveal the winning number.

Roulette Wheel Number Sequence

The pockets of the roulette wheel are numbered from 1 to 36.

In number ranges from 1 to 10 and 19 to 28, odd numbers are red and even are black. In ranges from 11 to 18 and 29 to 36, odd numbers are black and even are red.

There is a green pocket numbered 0 (zero). In American roulette, there is a second green pocket marked 00. Pocket number order on the roulette wheel adheres to the following clockwise sequence in most casinos:

Single-Zero Wheel 0-32-15-19-4-21-2-25-17-34-6-27-13-36-11-30-8-23-10-5-24-16-33-1-20-14-31-9-22-18-29-7-28-12-35-3-26

Double-Zero Wheel
0-28-9-26-30-11-7-20-32-17-5-22-34-15-3-24-36-13-1-00-27-10-25-29-12-8-19-31-18-6-21-33-16-4-23-35-14-2

The cloth covered betting area on a roulette table is known as the layout. The layout is either single zero or double zero. The European style layout has a single zero, and the American style layout is usually a double zero. The American style roulette table with a wheel at one end is now used in most casinos. The French style table with a wheel in the centre, and a layout on either side is rarely found outside of Monte Carlo.

Bagatelle (from the Chateau de Bagatelle) is a billiards-derived indoor table game, the object of which is to get a number of balls (set at nine in the 19th century) past wooden pins (which act as obstacles) into holes that are guarded by wooden pegs; penalties are incurred if the pegs are knocked over. It probably developed from the table made with raised sides for trou madame, which was also played with ivory balls and continued to be popular into the later nineteenth century, after which it developed into bar billiards, with influences from the French/Belgian game billard russe (with supposed Russian origins). A bagatelle variant using fixed metal pins, billard japonais, eventually led to the development of pachinko and pinball. Bagatelle is also laterally related to miniature golf. Other variants of bagatelle useful in the gaming industry drop one or more balls (from 0.5 inches to 6.0 inches) drop or pass along a sloped surface past pegs or bumps to be deposited into slots, holes, trays or other receptacles that indicates values, symbols or outcomes.

Additional improvements in gaming technology are desirable.

SUMMARY OF THE INVENTION

A game object is used as a moving object to provide a random outcome event by movement and final stoppage in an outcome indicating position or mode. Examples are die, dice, balls, roulette balls, roulette wheels and pointers on candy wheel. The object has:

a) a game object body;

b) the game object body containing an accelerometer microchip, power source and light-emitting elements within the game object body, light from the light-emitting body being visible outside the game object body or a receiver (wireless receiver for independently moving game elements and wireless or hard-wired if a fixed position game element); and c) the microchip or receiver closing an electronic circuit for a period of time less than 5 minutes after the game body is moved.

The game object may be used in games and gaming environments.

BRIEF DESCRIPTION OF THE FIGURES

FIG. 1 shows a standard roulette wheel and play board.

DETAILED DESCRIPTION OF THE INVENTION

A game object is used as a moving object to provide a random outcome event by movement and final stoppage in an outcome indicating position or mode. Examples are die, dice, balls, roulette balls, roulette wheels and pointers on candy wheel. The object has:

a) a game object body;

b) the game object body containing a an accelerometer microchip, power source and light-emitting elements within the game object body, light from the light-emitting body being visible outside the game object body; and c) the microchip closing an electronic circuit for a period of time less than 5 minutes after the game body is moved.

The game object may be used in games (non-wagering events) and gaming (wagering) environments. Among examples of the game is a die or dice with six faces having different alphanumerics (including symbols that represent numbers) on each face of the die, such as where the die has a transparent or translucent body having faces with numbers indicated by 1, 2, 3, 4, 5, and 6 dots on respective faces. The game object may be a ball, such as a ball that has a size less than 4 cm, such as a roulette ball, or multiple balls as in Pachinko or PLINKO™ games.

Any of the microchips may further contain a random number generator or a randomly timed event, especially in an automated gaming machine where individual game events (e.g., roulette or craps) in which game play and game object movement is done in predetermined time intervals (e.g., every two minutes) with wagering on each individual round of play.

The game object roulette ball or balls may contain multiple light-emitting elements (e.g., semiconductor light emitters, light emitting diodes), at least some of the light-emitting elements emitting light (each light-emitting element may have unique emitting wavelengths or ranges) in the visible spectrum different from at least some other light-emitting elements. In the roulette ball, the microchip may further have a random number generator, and the random number generator directs closure of a circuit between the power source a light-emitting element and ones of multiple light-emitting elements on a random basis. Again, the microchip may be programmed to close the circuit independent of any final position of a stop position for the game object.

Figure 2:
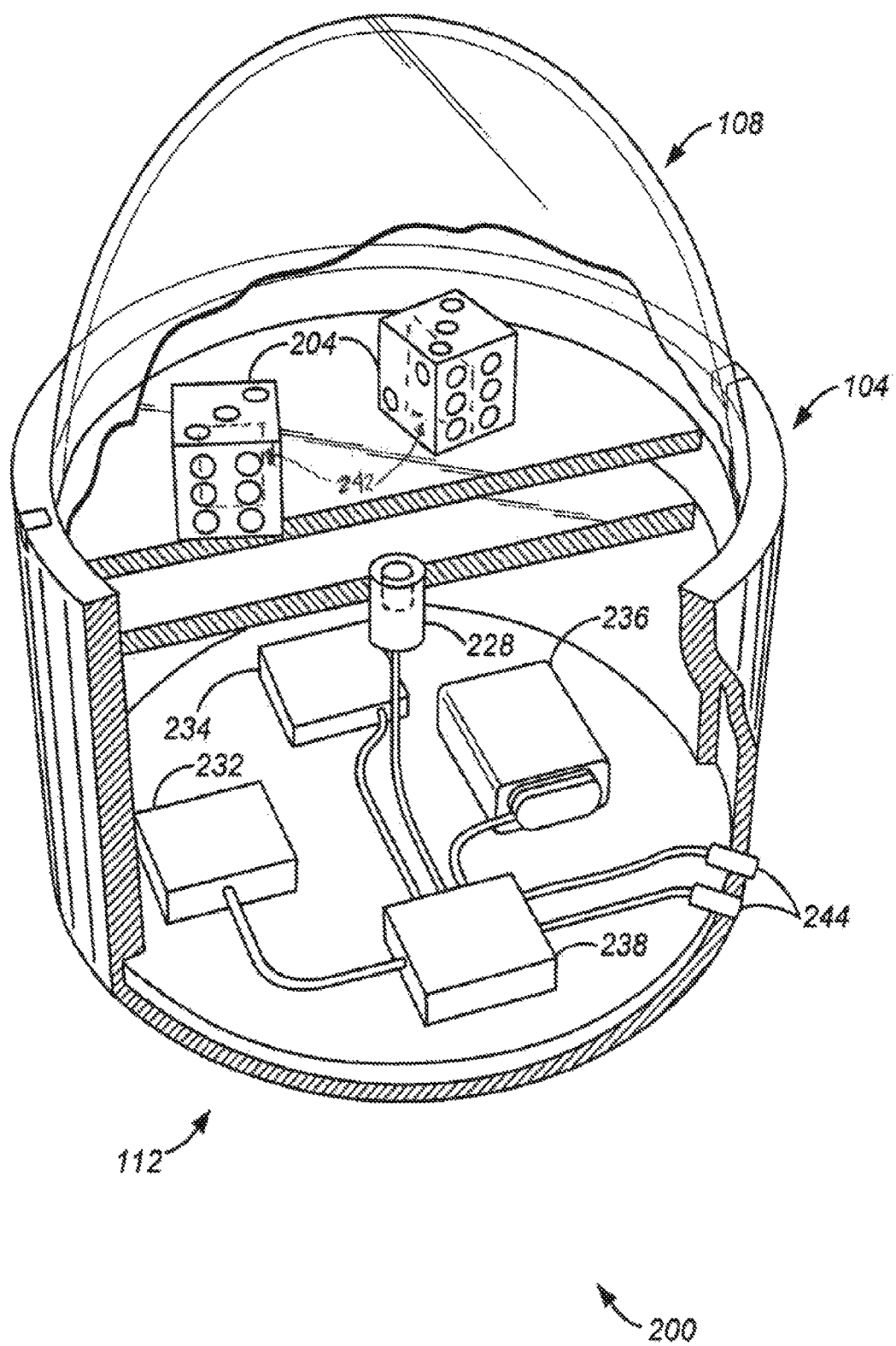
FIG. 2 shows a cutaway perspective view of a self-contained dice tossing system for two dice.

FIG. 2 shows a bagatelle board 200 with ball drop holes 202, ball drop slots 204, and pegs 206 Other variants of bagatelle useful in the gaming industry drop one or more balls (from 0.5 inches to 6.0 inches) drop or pass along a sloped surface 208 past pegs or bumps to be deposited into slots 204, holes 204 or other receptacles that indicates values, symbols or outcomes.

The game object may be a pointer that has a stop position indicating a random event outcome on a rotating wheel, such as on Big Six or a candy wheel game. The pointer may contain multiple light-emitting elements, at least some of the light-emitting elements emitting light in the visible spectrum different from at least some other light-emitting elements.

A method of playing a wagering game comprising uses a game object to provide a random outcome event by moving the game object and then stopping the game object to indicate a random event outcome. The game object may be:

a) a game object body;

b) the game object body containing a an accelerometer microchip, power source and light-emitting elements within the game object body, light from the light-emitting body being visible outside the game object body; and c) the microchip closing an electronic circuit for a period of time less than 5 minutes after the game body is moved.

The game object is caused to move (casting, throwing, spinning, rolling or moving an object to strike or repeatedly strike the game object as a physical step in the game or wagering game, Movement of the game object causes the microchip to close the circuit and cause at least one of the light-emitting elements to emit light. Light emission continues from the light emitting elements until the random outcome event has been indicated as a concluding random event on the game. The microchip opens the circuit to stop light-emission from the at least one light-emitting element.

The method may use a game object of a die, and the die is cast to cause the movement that initiates closing of the circuit. The microchip randomly selects at least one of a multiple number of circuits to close after movement has stopped, as by the die or dice in a stable position on a gaming table. The initial movement may cause the microchip to close at least one circuit to cause a light-emitting element to emit light, and stopping the movement causes the microchip to randomly select at least one light-emitting element to emit light while the game object is stopped.

The game object may be a roulette ball and spinning of the ball around a ridge of a roulette wheel, and the stopping of movement occurs after the roulette ball is fixed at a number position either while the wheel is still spinning or after the wheel has stopped spinning. Some greater control must be exercised in the timing of the final light, movement and wagering. For example, in die casting, if the player were shaking the dice and a beneficial color were shown before casting but while the dice were moving in the roller's hand, higher levels of wagers could be placed to the disadvantage of the casino. Therefore under some games where the wagering may occur after initial movement has begun (as by the shaking of dice, spinning the ball on the roulette wheel, spinning a candy wheel, and the like). To address this issue, a first circuit may be temporarily (or permanently) closed during initial movement, and that circuit opened or remain closed upon cessation of movement, where the microchip may randomly select at least one other circuit to close (e.g., with a different color light-emitting element) to alter colors or wavelengths enabled by the first closed circuit and the first light-emitting element. An object of the microprocessor is to eliminate any advance knowledge of a final color present on the gaming object when the event outcome of a game is determined.

In doing so, the microchip randomly may select at least one of a multiple number of circuits to close after movement has stopped, either as a sole color emitter or in combination with other light-emitters to create a blended color (recognizable by a game processor or visually) to provide an effect in the game event outcome. The initial movement may cause the microchip to close at least one circuit to cause a light-emitting element to emit light, and stopping the movement causes the microchip to randomly select at least one light-emitting element to emit light while the game object is stopped.

The method may be practiced where the game object includes a flexible pointer positioned adjacent a spinning wheel, and spinning of the wheel causes objects on the spinning wheel (posts, prongs, grooves, etc.) to strike and move the flexible pointer to cause the movement that initiates closing of the circuit within the pointer. Again, the microchip randomly selects at least one of a multiple number of circuits to close after movement has begun, and initial movement may cause the microchip to close at least one circuit to further cause a light-emitting element to emit light. The movement is stopped which may then cause the microchip to randomly select at least one light-emitting element to emit light while the game object is stopped.

The method may be played where initial movement causes the microchip to randomly close at least one circuit to cause a light-emitting element to emit light, and stopping the movement causes the microchip to retain light emission from the randomly selected closing of the circuit and/or randomly selects closing of at least one other circuit to cause a second light-emitting element to emit light when the objects on the spinning wheel cease striking the game object.

The electromechanical technology embedded and use in the present technology includes micro-technology available in the marketplace and are being improved regularly. The size of individual accelerometers and microchips are already less than 0.75 cm and therefore can be used within existing dimension game objects such as roulette balls, dice and medium-size drop-balls in PLINKO™ games and the like. The technology is very easily embedded in larger dimension pointers used in spin-wheel games with segments of the wheel indicating random event outcomes. Useful internal components include, for example, accelerometer microchips, MEMS, mCubes, such as Microchip Technology which manufactures an onboard 9-axis MEMS sensor, the system provides 3D orientation, tilt-compensated eCompass and continuous auto calibration modules.

Microchip Technologies has recently unveiled their GestIC technology as implemented in the soon-to-be-available MGC3130 chip, an outgrowth of an earlier technology. When used as a 3D digitizer, the MGC3130 resolves position within a cube at a remarkable resolution of 150 dpi. (That's vertical resolution as well as in the plane, meaning that roughly a billion voxels (3D pixels) can be distinguished within the scanning volume.) The sampling rate is 200 measurements per second, allowing the GestIC technology to follow quick adjustments of hand and finger positions, velocities, and accelerations.

Micro-electromechanical systems (MEMS) is a technology that combines computers with tiny mechanical devices such as sensors, valves, gears, mirrors, and actuators embedded in semiconductor chips. Paul Saffo of the Institute for the Future in Palo Alto, Calif., believes MEMS or what he calls analog computing will be "the foundational technology of the next decade." MEMS is also sometimes called smart matter.

MEMS are already used as accelerometers in automobile air-bags. They've replaced a less reliable device at lower cost and show promise of being able to inflate a bag not only on the basis of sensed deceleration but also on the basis of the size of the person they are protecting. Basically, a MEMS device contains micro-circuitry on a tiny silicon chip into which some mechanical device such as a mirror or a sensor has been manufactured. Potentially, such chips can be built in large quantities at low cost, making them cost-effective for many uses.

Among the presently available uses of MEMS or those under study are:

Global position system sensors that can be included with courier parcels for constant tracking and that can also sense parcel treatment en route.

Sensors built into the fabric of an airplane wing so that it can sense and react to air flow by changing the wing surface resistance; effectively creating a myriad of tiny wing flaps.

Optical switching devices that can switch light signals over different paths at 20-nanosecond switching speeds.

Sensor-driven heating and cooling systems that dramatically improve energy savings.

Building supports with imbedded sensors that can alter the flexibility properties of a material based on atmospheric stress sensing These sensors have lines of communication (hard-wired or wireless) to the circuitry between the light emitters and power source for the light-emitters. These sensors act to close (to effect light emission) and open (to stop light emission) upon detection of appropriate movement, cessation of movement or changes in the type of movement. An application-specific integrated circuit (ASIC) is an integrated circuit (IC) customized for a particular use, rather than intended for general-purpose use. For example, a chip designed to run in a digital voice recorder or a high-efficiency Bitcoin miner is an ASIC. Application Specific Standard Products (ASSPs) are intermediate between ASICs and industry standard integrated circuits like the 7400 or the 400 series. These ASICs (and FPGAs) may be designed to act as the sensor or connection between the sensor and the circuitry to open and close circuits.

As feature sizes have shrunk and design tools improved over the years, the maximum complexity (and hence functionality) possible in an ASIC has grown from 5,000 gates to over 100 million. Modern ASICs often include entire microprocessors, memory blocks including ROM, RAM, EEPROM flash memory and other large building blocks. Such an ASIC is often termed a SoC (System on Chip). Designers of digital ASICs often use a hardware description language (HDL), such as Verilog or VHDL, to describe the functionality of ASICs.

Field programmable gated arrays (FPGAs) (FPGA) are the modern-day technology for building a breadboard or prototype from standard parts; programmable logic blocks and programmable interconnects allow the same FPGA to be used in many different applications. For smaller designs or lower production volumes, FPGAs may be more cost effective than an ASIC design even in production. The non-recurring engineering (NRE) cost of an ASIC can run into the millions of dollars.

An accelerometer is a device that measures proper acceleration ("g-force"). Proper acceleration is not the same as coordinate acceleration (rate of change of velocity). For example, an accelerometer at rest on the surface of the Earth will measure an acceleration $g=9.81$ m/s$^2$ straight upwards. By contrast, accelerometers in free fall orbiting and accelerating due to the gravity of Earth will measure zero.

Accelerometers have multiple applications in industry and science. Highly sensitive accelerometers are components of inertial navigation systems for aircraft and missiles. Accelerometers are used to detect and monitor vibration in rotating machinery. Accelerometers are used in tablet computers and digital cameras so that images on screens are always displayed upright. Accelerometers are used in drones for flight stabilization. Pairs of accelerometers extended over a region of space can be used to detect differences (gradients) in the proper accelerations of frames of references associated with those points. These devices are called gravity gradiometers, as they measure gradients in the gravitational field. Such pairs of accelerometers in theory may also be able to detect gravitational waves.

Single- and multi-axis models of accelerometer are available to detect magnitude and direction of the proper acceleration (or g-force), as a vector quantity, and can be used to sense orientation (because direction of weight changes), coordinate acceleration (so long as it produces g-force or a change in g-force), vibration, shock, and falling in a resistive medium (a case where the proper acceleration changes, since it starts at zero, then increases). Micromachined accelerometers are increasingly present in portable electronic devices and video game controllers, to detect the position of the device or provide for game input.

Conceptually, an accelerometer behaves as a damped mass on a spring. When the accelerometer experiences an acceleration, the mass is displaced to the point that the spring is able to accelerate the mass at the same rate as the casing. The displacement is then measured to give the acceleration.

In commercial devices, piezoelectric, piezoresistive and capacitive components are commonly used to convert the mechanical motion into an electrical signal. Piezoelectric accelerometers rely on piezoceramics (e.g., lead zirconate titanate) or single crystals (e.g. quartz, tourmaline). They are unmatched in terms of their upper frequency range, low packaged weight and high temperature range. Piezoresistive accelerometers are preferred in high shock applications. Capacitive accelerometers typically use a silicon micromachined sensing element. Their performance is superior in the low frequency range and they can be operated in servo mode to achieve high stability and linearity.

Modern accelerometers are often small micro electromechanical systems (MEMS), and are indeed the simplest MEMS devices possible, consisting of little more than a cantilever beam with a proof mass (also known as seismic mass). Damping results from the residual gas sealed in the device. As long as the Q-factor is not too low, damping does not result in a lower sensitivity.

Under the influence of external accelerations the proof mass deflects from its neutral position. This deflection is measured in an analog or digital manner. Most commonly, the capacitance between a set of fixed beams and a set of beams attached to the proof mass is measured. This method is simple, reliable, and inexpensive. Integrating piezoresistors in the springs to detect spring deformation, and thus deflection, is a good alternative, although a few more process steps are needed during the fabrication sequence. For very high sensitivities quantum tunneling is also used; this requires a dedicated process making it very expensive. Optical measurement has been demonstrated on laboratory scale.

Another, far less common, type of MEMS-based accelerometer contains a small heater at the bottom of a very small dome, which heats the air inside the dome to cause it to rise. A thermocouple on the dome determines where the heated air reaches the dome and the deflection off the center is a measure of the acceleration applied to the sensor.

Most micromechanical accelerometers operate in-plane, that is, they are designed to be sensitive only to a direction in the plane of the die. By integrating two devices perpendicularly on a single die a two-axis accelerometer can be made. By adding another out-of-plane device three axes can be measured. Such a combination may have much lower misalignment error than three discrete models combined after packaging.

Micromechanical accelerometers are available in a wide variety of measuring ranges, reaching up to thousands of g's. The designer must make a compromise between sensitivity and the maximum acceleration that can be measured.

The accelerometers and microchips and other elements may be combined within the gaming object to be used with proximity sensors (e.g., in the ball to determine when it is seated within a canoe or drop slot in a ball-drop game, transducer, switches and the like. As noted, the moving object need not come to a complete stop before the final light effect is provided. A good example of this feature is shown in a roulette wheel.

Betting is stopped in roulette either before the ball initially spins around the rim, and always before the ball begins to drop towards the numbered slots o canoes in the wheel. As the sensors can measure speed, angular velocity and relative directions of movement and changes in directions of movement. For example, the sensor may trigger final light movement when the angular velocity drops below a specific limit usually targeted as an end of wagering time, or when the direction of movement changes from movement around the rim to a descent towards the numbered slots or canoes. The change in color to the final color, or a change even to an intermediate color before the final color may be used to signal a close of all wagers on that game event. Where electronic wagering is associated with the gaming table, sensing of an intermediate color change or the final color change (e.g., by a camera or even signal emissions from the game object) can trigger the electronic wagering positions to close so that no further wagers can be entered and accepted by the wagering system.

Game content useful within the scope of the presently disclosed technology is quite extensive. A summary of the novel game content is as follows.

Existing paytables may be altered according to colors of the game object, other by colors altering the paytables themselves, or by players wagering on paytables that are dependent upon a specifically wagered color or specific combinations of or specific sets of colors wagered upon. Using the simplest technology of a spin wheel and pointer, these variations can be better appreciated.

In a standard spin wheel game, players wager on specific numbers or values (e.g., 1×, 2×, 5×, 10×, 20×, 100×, etc.) and if the wagered number or value is the random outcome of the stopped pointer on the wheel, the wager is played at fixed odds. There is never any variation in the types of payouts available.

In a wheel and pointer system, changing ball colors alter payouts. For example, if a ball ends up as a "gold" color, the paytable may alter such that a 1× payout becomes a 2× payout and a 2× payout gives the player a free wager on the next spin at 2× and 5×, with no payment on the "gold" ball outcome. Another game format is to have the wheel also change colors randomly at each canoe, and if a ball matches the slot color, there is an increased payout or additional free spins at the same wagering amount. Comps at the gaming establishment, hotel or managing group may also be provided from matching color ball and slot.

Multiple balls may be used, with players wagering on both outcomes (numbers or values) and colors to be determined by the pointer changing color so that increased payouts can be provided. By adjusting the payout odds (e.g., $1.00 returns $0.90 on a high frequency color and returns $10.00 on a low frequency color), higher awards can be provided and a house advantage can be adjusted as desired.

In a bagatelle game, wherein slots or holes have different values (e.g., $1.00, $0.00, or $10.00), different symbols (e.g., poker ranks, payment symbols such as in slot machines, alphanumerics, etc.), and/or multipliers, the outcomes are fixed with respect to the final ball position. Using the present technology, the balls (and even the ball drop positions) can have the randomly provided colors. The player is able to wager on both the symbology, numbers and values, and may also be able to make the original wager directed towards a specific one of the available random colors and/or a matched set of colors, as in both the ball and the receptacle. The receptacles may also have fixed or randomly selected colors (provided independently at their own frequency) so that the probability and especially low probability of their matching can provide for higher payouts on the game. Rather than being limited to payouts of 1× to 25×, payouts on wagers can be 100×, 500×, 1000×, or even progressive jackpots with extremely large and increasing jackpots in the game. Players may wager on conventional bagatelle events or various color-oriented events that are randomly generated by the balls, alone or in combination with random or fixed colors in ball drops or slots.

The roulette game may use one or multiple color changing roulette balls, with canoes or slots adjusted or not to accept multiple balls.

With dice, payout odds and even losses can be altered or moderated. For example, if both dice are the lowest frequency color and a "seven-out" occurs, the house may collect only pass line wagers and odds, while all proposition bets (e.g., craps, eleven, hopping number, world bet, etc.) may not be collected. This would promote wagering on outcomes with a higher house advantage and increase house profits. Other dice outcomes, such as the highest probability color occurring in both dice on a seven-out may allow all hard-ways wagers to remain active and not be collected. It is also possible that where identical colors or the same lowest probability colors occur in a 1-1 or 6-6 outcome, all previous come bets (not the odds) are paid at 1:1.

Alternatively, after such an event, all wagers are frozen, but all odds bets ON THE NEXT ROLL are increased (e.g., 4 and 10 odds will pay 2.5:1, 5 and 9 odds are paid at 2:1, and 6 and 8 odds are paid at 7:5).

In Pachinko or PLINKO™ games where multiple balls are dropped, special final color balls may count as multiple balls or provide a special bonus with special colors.

The bagatelle-type game system may be generally described as follows.

A wagering game system used to provide a random outcome event by movement and final stoppage of a projectile in an outcome indicating mode may have:

a) a projectile used as a game object;

b) the game object containing an accelerometer microchip, power source and light-emitting elements within the game object body, light from the light-emitting body being visible outside the game object body;

c) the microchip closing an electronic circuit for a period of time after the game body is moved; and d) a game platform surface on which the projectile moves and then stops in a projectile stopping receiver.

The wagering game system may have the projectile consist of a ball. The platform surface may have pegs or moguls, or slopes to deflect the ball as it moves on the surface to promote random movement. The projectile stopping receiver may be one or more holes in the game platform surface, alone or in combination with projectile stopping receivers as a receptor space between two ridges in the game platform surface.

FIG. 2 is a perspective cutaway view of a self-contained dice outcome system 200. This illustrates a specific example of a dice shaker assembly 200. As illustrated in FIG. 2, dice 204 with embedded microprocessors/microchips/accelerometers 242 are contained within a dice receptacle 104 and a cover member 108. As discussed herein, various types of dice, dice receptacles, and cover members may be used. For example, the cover member 108 illustrated in FIG. 2 is a clear glass dome through which the dice are visible.

At 112, an example of a sensor assembly is illustrated. According to various embodiments, various types, numbers, and configurations of components may be used in a sensor assembly. As is illustrated in FIG. 2, one or more electronic components may be located within the dice shaker assembly. For example, the electronic components may include one or more of a power supply, a processor, a memory device, a communication device, a sensor assembly, etc. (or some combination thereof). In the example illustrated in FIG. 2, the components include transmitter/receiver 234, motion unit 232, battery 236, game processor 238, and sensor platform movement 228, and I/O ports 244. Components such as these will be discussed in greater detail below. It should be noted that the components included in the example dice shaker assembly are only an example configuration of components. In different embodiments, different types, configurations, and/or numbers of components may be used. For example, as will be discussed herein, in some embodiments the dice shaker assembly may include one or more mechanical, rather than electronic, components. The dice shaker assembly 200 in FIG. 2 usually has larger size dice 204 within the dice shaker assembly, which allows for the microprocessor/microchips 242 to be embedded within the cover member 108.

The electronic components present in some embodiments of a dice shaker assembly are powered by one or more power sources, such as a rechargeable battery. Various techniques may be used to provide power to the dice shaker assembly, such as human kinetics (e.g., during shaking), electronic induction, and/or physically coupling the dice shaker assembly to an external power source. As will be described herein, however, in some embodiments the dice shaker assembly may operate without any electric power, such as through the use of mechanical sensors, switches, etc.

In some embodiments, the dice shaker assembly may include a power indicator. A power indicator may provide an indication of how much power is left in a battery associated with the dice shaker assembly or indicate a lower power condition. Various types of power indicators may be used, such as audible alarms, LED displays, LCD displays, etc. Additionally, or alternately, in some embodiments information related to the amount of power remaining in the dice shaker assembly may be transmitted to one or more external devices.

In some embodiments, a dice shaker assembly may also include one or more external ports. According to various embodiments, external ports may be operable to perform various functions. For example, in some embodiments one or more external ports may be operable to couple with an external power source to charge a rechargeable battery in the dice shaker assembly. Alternately, one or more external ports may be operable to communicate with one or more external devices, such as to convey information related to shake quality and/or shake outcome.

Figure 2A:
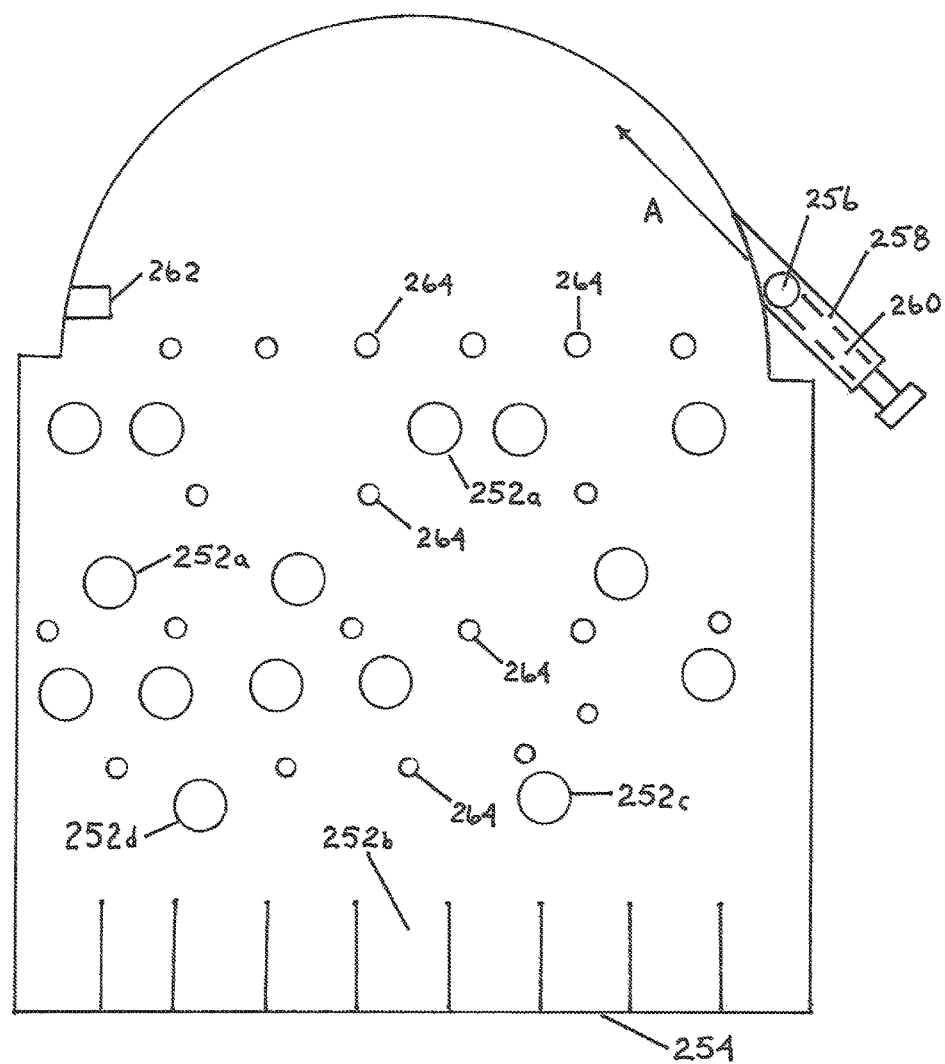
FIG. 2A shows a bagatelle board with ball drops.

FIG. 2A shows front view of a bagatelle board 250 with hole ball drops 252a and slot ball drops 252b at the bottom 254 of the board 250. A gaming device 256 according to the presently disclosed technology capable of providing random colors is nestled in a ball support cup 258 at the end of a ball ejection trigger or plunger 260. The gaming device (here a ball) 256 is ejected along pathway A where it falls towards the bottom 254 of the board 250. An initial, resilient (e.g., rubber or padded) bumper 262 is often provided to prevent a hard ball release from damaging parts of the bagatelle board 250. As the ball gaming device 256 begins its fall towards the bottom 254 of the board 250, it may first impact pegs 264 on the board 250 to randomly deflect a falling pathway or trajectory of the ball game device 256. Either the initial ejection, impact with the resilient bumper 262, impact with the pegs or moguls 264, dropping into hole 252a or stopping within slots 252b may be the end of movement event within the game. When the ball game device 256 is captured in a hole 252a, the ball game device 256 will usually be supported at a level within the hole 252a so that the final color can be observed.

Figure 3:
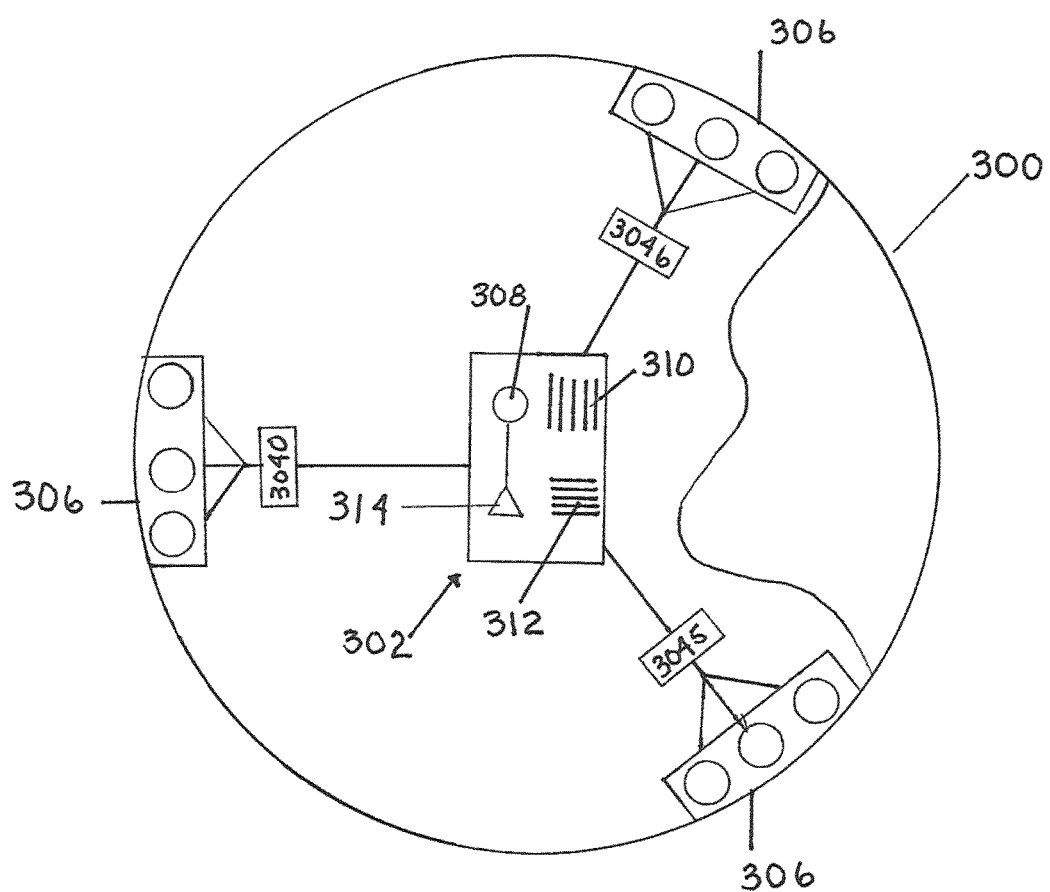
FIG. 3 shows a cutaway view of a ball having a microprocessor, circuits and light-emitting elements

FIG. 3 shows a cutaway view of a ball 300 having a microprocessor 302, on-off circuits 304 and light-emitting elements 306, and a power supply 308 with independent on-off circuits 304a, 304b, and 304c controlled by the microprocessor 302 connecting the power supply 308 to the light-emitting elements 306. The power supply (e.g., battery) may be rechargeable as by a radiofrequency receiver or motion recharging element 314. Each light-emitting element may have 1, 2 or 3 (320, 322 and 324) independent light emitting sub-elements (e.g., red, green and blue LEDs, or other combinations of colors), and the three with independent on-off circuits 304a, 304b, and 304c may have a multiple (e.g., in this case, three-way) communication line 326 to the independent light emitting sub-elements so that the microprocessor 302 directs the specific final color to be emitted by one or more of the independent light emitting sub-elements 320, 322 and 324. The microprocessor 302 is shown with specific circuitry 310 for motion sensing and direction of motion and circuitry 312 for timing functions and random event generation.

Figure 4:
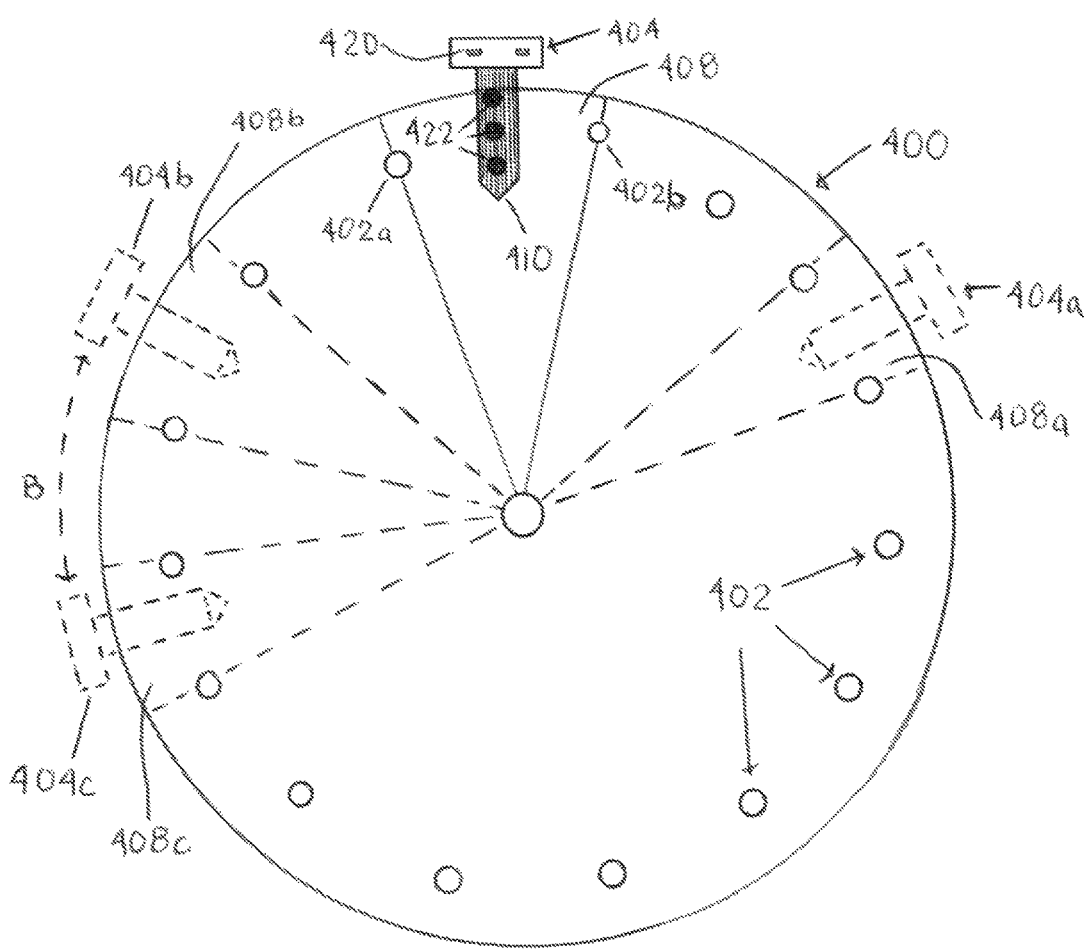
FIG. 4 shows a spinning wheel with pegs and a sensor-containing pointer.

FIG. 4 shows a spinning wheel 400 with pegs 402 and a major sensor-containing pointer 404. The major sensor-containing pointer 404 has a flexible or pivoting pointing tip 410 that is shown extending between pegs 402a and 402b that define an outcome area 408. Upon first strike of the pegs 402a or 402b, the sensor 420 within the major sensor-containing pointer 404 initiates light-emission diodes 422 (none, one, two or three, for example) to emit light and eventually emit a final color upon cessation of impact with the pointer 404 and stopped motion. Also shown are pointers with sensors 404a, 404b and 404c which may represent stop positions for the pointer 404 where the pointer moves, or may represent a set of one, two or three additional pointers with sensors on which wagers may be placed. One or more of the four shown pointers may not have sensors, and one or more of the pointers with sensors may shift positions (within limits so as to not impact any other pointer) around the wheel so that specific distances (or angular positions) between outcomes from the multiple pointers are not fixed. This works most simply where there is one fixed pointer with sensor and one pointer (with or without sensor) that rotates about the wheel, with freedom of movement that excludes at least the area between 402a and 402b, and likely at least one adjacent area one each side next to 402a and 402b, and alternatively two or three or more sets of adjacent areas on one or both sides next to 402a and 402b. Thus wagers may be placed on one or more of multiple pointers with sensors and random light emission. Wagers may be made on one or more specific colors (usually with different colors being wagered on, separate wagers on each color should be made. With multiple wagers on multiple pointers and each wager selecting a color, movement of a sensor-containing pointer 404b. 404c occurs between different positions around the wheel 400. The movement arc B between two different symbol or random event outcomes by a single sensor or non-sensor containing pointer (e.g., 404b moving to position of the sensor 404c) creates an additional randomization as a pointer may move independently (alone or in combination with the wheel spinning).

The pointers may be made of an elastomeric material rubber, polymer or coated element) to reduce wear against or on the pegs 402 and the pointers may swivel or pivot to assist in reducing these types of wear.

The timing and duration of the light-emission can be programmed into the microprocessor to occur at different designed times and durations, some of which have been indicated above. One simple modality is that the final color remains until movement of the game object begins again in a next game play event. For dice, this could be the first bounce on casting, with a roulette ball it could be initial movement on the rim or first bounce off a deflector on the roulette wheel. For the spinning wheel with pointer, this could be the first strike by pegs when spinning.

Alternative game objects may be used as moving objects to provide a random outcome event by movement and final stoppage in an outcome indicating position or mode. Examples are die, dice, balls, roulette balls, roulette wheels and pointers on candy wheel. The object has:

a) a game object body;

b) the game object body containing an accelerometer microchip, power source and light-emitting elements within the game object body, light from the light-emitting body being visible outside the game object body or a receiver; and c) the microchip or receiver closing an electronic circuit for a period of time less than 5 minutes after the game body is moved.

The game object body may contain a receiver in communication with a transmitter outside of the game body. The transmitter may operate through wireless (wifi, Bluetooth, RF or other electromagnetic communication) or by wired connection where (as with a pointer or surface contact with a communicating surface forming a wired connection into the object body to signal the circuits to open and close), the transmitter transmitting outcomes from a random number generator to the receiver to direct closure of at least one of the electronic circuits. The external random number generator operates to provide the same effects as the internal random number generator described above. As the signal may be wireless transmitted, additional security for the signals should be imposed on the system. The security can be imposed by numerous known methodologies such as signal encryption, variable signal emission, variable frequency emissions, and other encoding, masking and screening transmission technology. Other signal securing technologies may also be used.

As with the previously described game objects with internal processors, the game object of the external processor system may still have multiple light-emitting elements within the game object body, and multiple independent circuits each in communication with individual ones of the multiple light-emitting elements, the receiver providing signals to close at least one circuit to cause a light-emitting element to be lit. Again, at least two of the multiple light-emitting elements emit light of different colors and the random number generator outcome identifies which of the multiple light-emitting elements will be lit. Outcomes from the random number generator are weighted so that different light-emitting elements are to be lit at different frequencies. This weighting of outcomes still maintains randomness of outcomes, even though probabilities of the individual color outcomes are not equal. This can be done by known probability weighting methods. For example, if there are 5 possible color outcomes, the random number generator may be provided with 1000 possible outcomes of which one color outcome may be available from 600 of the 1000 outcomes, a second color may be assigned to 250 of the 1000 outcomes, a third color may be assigned 240 of the 1000 outcomes, a fourth color may be assigned 9 of the 1000 outcomes and the fifth color may be assigned 1 of the 1000 outcomes.

The game object may have signals from the transmitter to the receiver encrypted to identify source of the signals from the transmitter, the specific receiver in the game body and exclude reception of signals by the receiver that will close one of the multiple circuits.

Other alternative technologies and systems within the scope of the present technology may also be used. Receiver slots and receiver holes may be provided with randomly selected light emitters, with the ball drop triggering a random selection of a light color. The ball may still flash color during movement and stop changing color upon cessation of movement (which may be trivial if the receptor, slot or hole becomes a color indicator). The receptors may flash different colors as an attractive display, but with the final color still being randomly provided by random selection, random time intervals until ball capture, or by random number generator in a processor in the game play surface. The random number generation may be initiated by the ball reception to trigger random color outcome selection, with the fact of the reception having no influence over the ball color outcome except for initiation of the random selection by the processor. The receptor areas my make electrical and electronic signal connection with the game device to provide a signal to the light-emitting elements (in the game device or the receptor areas). For example, in a popper device for dice, the popper surface may make electronic connection to the face of the die in contact with the surface and send a signal (for random color generation) to the circuits in the die. The signal(s) from the processor would be transmitted into the game body or receptor positions to cause random color light-emission.

Other alternative constructions and parallel components and varied structures are within the skill of the artisan and within the scope of the generic invention described herein.

What is claimed:

1. A wagering game system used to provide a random outcome event by movement and final stoppage of a pointer in an outcome indicating mode comprising: a) the pointer in combination with a rotating wheel used as a game object; b) the pointer containing an accelerometer microchip, power source and light-emitting elements within the pointer body, light from the light-emitting elements being visible outside the pointer body; c) the accelerometer microchip closing an electronic circuit for a period of time after the pointer is moved or struck; and d) a game platform surface on the wheel which has projections that strike the pointer when the wheel spins and the wheel is struck by the projections and then the wheel stops with the pointer indicating a random event outcome on the wheel; and e) a random final color is provided by the light-emitting elements when the rotating wheel stops.

2. The wagering game system of claim 1 wherein the pointer is flexible, pivots or is flexible and pivots.

3. The wagering game system of claim 2 wherein the platform surface comprises pegs to strike the pointer as the wheel moves on the surface and then pegs define areas on the wheel with random event outcomes identified between adjacent pegs.

4. The wagering game system of claim 3 wherein the pointer contains at least some of the light emitting elements, and among the light emitting elements are individual light-emitting elements that individually emit different color lights; wherein the pointer moves angularly about the wheel while the wheel spins.

5. The wagering game system of claim 3 wherein multiple pointers are present and at least one of the multiple pointers comprise an accelerometer microchip, power source and light-emitting elements within the pointer body or in a second element in communication with the pointer, light from the light-emitting body being visible outside the pointer; and wherein multiple pointers are present and at least one of the multiple pointers comprise an accelerometer microchip, power source and light-emitting elements within the pointer body or in a second element in communication with the pointer, light from the light-emitting body being visible outside the pointer and at least one pointer moves angularly about the wheel while the wheel spins and at least one pointer is in a fixed position relative to the spinning wheel.

6. The wagering game system of claim 1 wherein the wheel and pointer comprises a gaming device selected from the group consisting of a big six wheel and a candy wheel.

7. The wagering game system of claim 1 wherein the pointer contains multiple light-emitting elements, at least some of the light-emitting elements emitting light in the visible spectrum different from at least some other light-emitting elements.

8. The wagering game system of claim 7 wherein the accelerometer microchip further comprises a random number generator, and the random number generator directs activation of a circuit between the power source and ones of the multiple light-emitting elements on a random basis.

9. The wagering game system of claim 1 wherein the accelerometer microchip is programmed to activate the circuit independent of any final position of a stop position for the pointer.

10. The wagering game system of claim 1 wherein the pointer is used in combination with a rotating wheel that has stop positions indicating random event outcomes on the rotating wheel.

11. The wagering game system of claim 10 wherein the pointer contains multiple light-emitting elements, at least some of the light-emitting elements emitting light in the visible spectrum different from at least some other light-emitting elements.

12. A method of playing a wagering game comprising using a wagering game system used to provide a random outcome event by movement and final stoppage of a pointer in an outcome indicating mode comprising: a) the pointer in combination with a rotating wheel used as a game object; b) the pointer containing an accelerometer microchip, power source and light-emitting elements within the pointer body, light from the light-emitting elements being visible outside the pointer body; c) the electronic microchip activating an electronic circuit for a period of time after the pointer is moved or struck; and d) a game platform surface on the wheel which has projections that strike the pointer when the wheel spins and the wheel is struck by the projections and then the wheel stops with the pointer indicating a random event outcome on the wheel; and e) a random final color is provided by the light-emitting elements when the rotating wheel stops;

wherein the game object is caused to move as a physical step in the wagering game, and movement of the game object causes the accelerometer microchip to activate the electronic circuit and cause at least one of the light-emitting elements to emit light; continuing light emission from the light emitting elements until the random outcome event has been indicated; and the microchip deactivating the circuit to stop light-emission from the at least one light-emitting element.

13. The method of claim 12 wherein the game object consists of a rotating wheel and stationary pointer, and rotation of the wheel impacts the pointer to initiate activating of the circuit; wherein the microchip randomly selects at least one of a multiple number of circuits to close after movement has stopped; wherein initial movement causes the microchip to activate at least one circuit to cause a light-emitting element to emit light, and stopping the movement causes the microchip to randomly select at least one light-emitting element to emit light while the rotating wheel is stopped; and the stopping of movement occurs after the rotating wheel has stopped at a number position indicated by the pointer; wherein the microchip randomly selects at least one of a multiple number of circuits to cause a light-emitting element to emit light, and stopping the movement causes the microchip to randomly select at least one light-emitting element to emit light while the rotating wheel is stopped; wherein the pointer consists of a flexible pointer positioned adjacent a spinning wheel, and spinning of the wheel causes objects on the spinning wheel strike and move the flexible pointer comprises the movement that initiates closing of the circuit within the pointer.

14. A wagering game system used to provide a random outcome event by movement and final stoppage of a pointer in an outcome indicating mode comprising: a) the pointer in combination with a rotating wheel used as a game object; b) the pointer containing an accelerometer microchip, power source and light-emitting elements within the pointer body, light from the light-emitting elements being visible outside the pointer body; c) the microchip accelerometer closing an electronic circuit for a period of time after the pointer body is moved or struck; and d) a game platform surface on the wheel which has projections that strike the pointer when the wheel spins and the wheel is struck by the projections and then the wheel stops with the pointer indicating a random event outcome on the wheel; and e) a random final color is provided by the light-emitting elements when the rotating wheel stops.

15. The wagering game system of claim 14 wherein the pointer is flexible, pivots without flexibility or is flexible and pivots.

16. The wagering game system of claim 15 wherein the rotating wheel comprises pegs to strike the pointer as the rotating wheel rotates and the pegs define areas on the wheel with random event outcomes identified between adjacent pegs.

17. The wagering game system of claim 16 wherein the pointer contains at least some of the light emitting elements, and among the light emitting elements are individual light-emitting elements that individually emit different color lights; wherein the pointer moves angularly about the wheel while the wheel spins.

18. The wagering game system of claim 16 wherein multiple pointers are present and at least one of the multiple pointers comprise an accelerometer microchip, power source and light-emitting elements within the pointer body or in a second element in communication with the pointer, light from the light-emitting body being visible outside the pointer; and wherein multiple pointers are present and at least one of the multiple pointers comprise an accelerometer microchip, power source and light-emitting elements within the pointer body, light from the light-emitting body being visible outside the pointer and at least one pointer moves angularly about the wheel while the wheel spins and at least one pointer is in a fixed position relative to the spinning wheel.

19. A game object provided as a pointer adjacent to a rotating wheel with pegs thereon to provide a random outcome event by movement of the pointer and stopping the pointer in an outcome indicating position or mode and the pointer containing an accelerometer microchip, power source and light-emitting elements within a pointer body of the pointer, light from the light-emitting body being visible outside the pointer; and c) the accelerometer microchip activating an electronic circuit for a period of time less than 5 minutes after the pointer body is moved.

20. The game object of claim 19 wherein the pointer contains a receiver in communication with a transmitter outside of the pointer, the transmitter transmitting outcomes from a random number generator to the receiver to close the electronic circuit.

21. The game object of claim 19 wherein there are multiple light-emitting elements within the pointer, and multiple independent circuits each in communication with individual ones of the multiple light-emitting elements, the receiver providing signals to activate at least one circuit to cause a light-emitting element to be lit, and wherein at least two of the multiple light-emitting elements emit light of different colors and the random number generator outcome identifies which of the multiple light-emitting elements will be lit.

* * * * *